United States Patent [19]

Dobbins

[11] 3,954,003

[45] May 4, 1976

[54] APPARATUS FOR TESTING END CLOSURES

[75] Inventor: Walter James Dobbins, Hawthorn Woods, Ill.

[73] Assignee: American Can Company, Greenwich, Conn.

[22] Filed: June 20, 1975

[21] Appl. No.: 588,712

[52] U.S. Cl. .................................. 73/40; 73/45.2
[51] Int. Cl.² ........................................ G01M 3/04
[58] Field of Search .............. 73/37, 40, 45.2, 45.3, 73/46, 47, 49.2, 49.8

[56] References Cited
UNITED STATES PATENTS

| | | | |
|---|---|---|---|
| 2,696,107 | 12/1954 | Blaing-Leisk | 73/45.2 |
| 3,015,388 | 1/1962 | Wilckens | 73/45.3 X |
| 3,360,983 | 1/1968 | Smith | 73/45.3 |
| 3,501,945 | 3/1970 | Bailey et al. | 73/40 |
| 3,875,789 | 4/1975 | Orosy | 73/40 |
| 3,875,790 | 4/1975 | Herdzina et al. | 73/40 |

Primary Examiner—Richard C. Queisser
Assistant Examiner—Joseph W. Roskos
Attorney, Agent, or Firm—Robert P. Auber; Paul R. Audet; Ira S. Dorman

[57] ABSTRACT

Improved apparatus for testing end closures for leakage, of the type which includes a test chamber formed by a vertically reciprocable upper chambered member and a fixed lower chambered member having seating means for seating the end closure in registered position thereon, the improvement in the upper chambered member comprising end closure movement preventing means for contacting the end closure to prevent its premature movement and loss of registration from its registered seated position during vertical movement of the upper chambered member.

4 Claims, 7 Drawing Figures

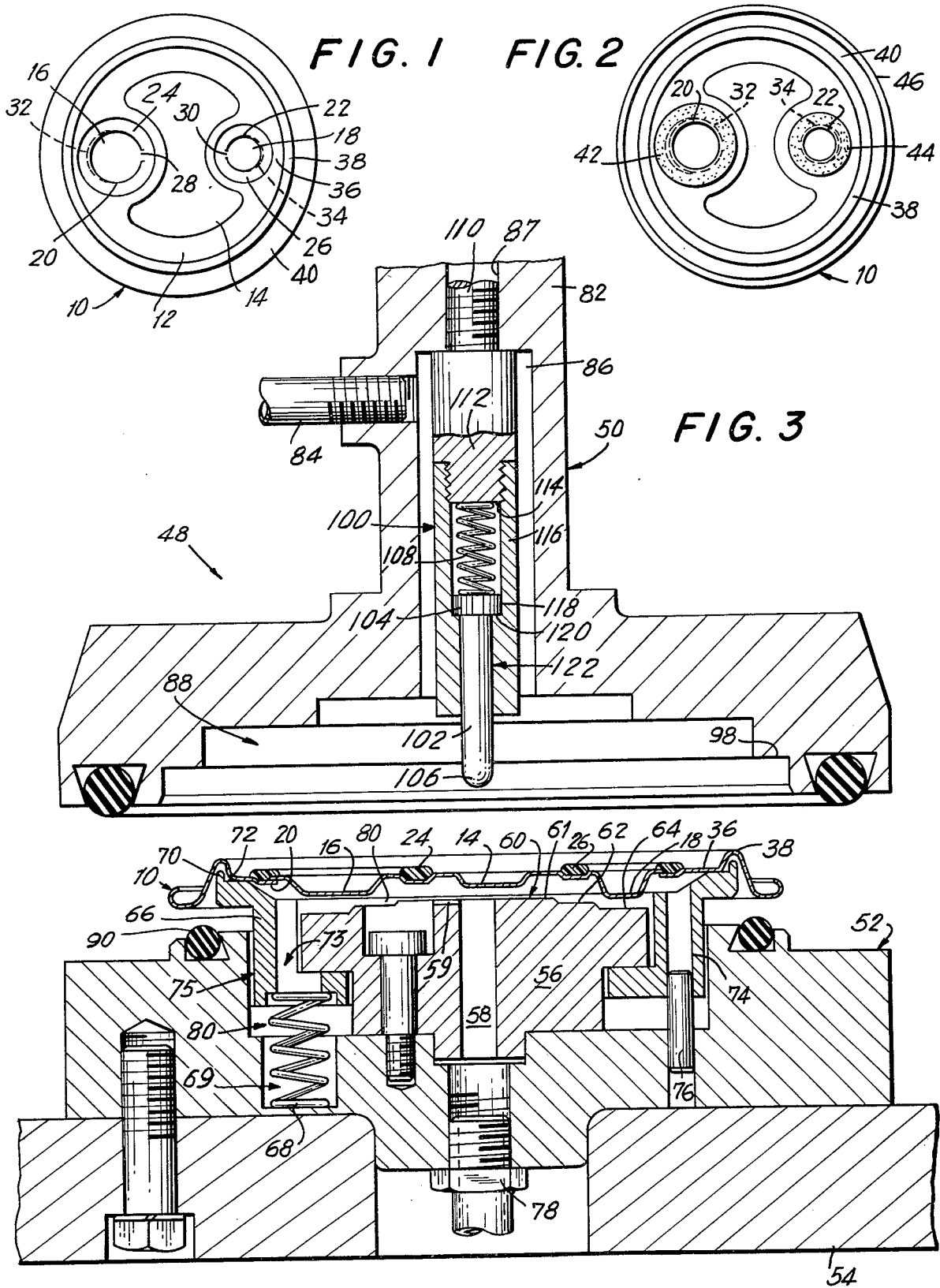

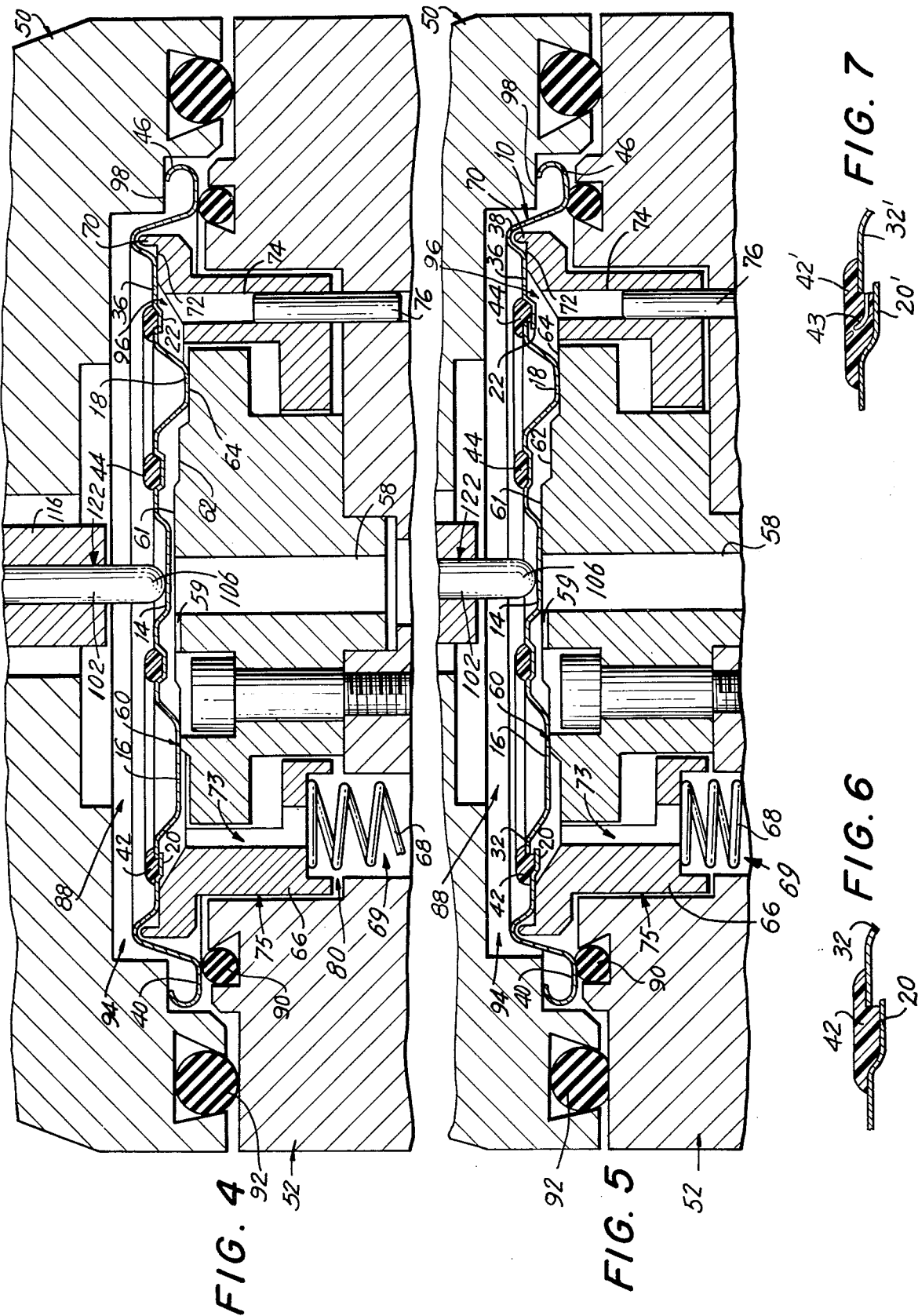

APPARATUS FOR TESTING END CLOSURES

BACKGROUND OF THE INVENTION

This invention relates to the art of testing container end closures for leakage.

Various apparatus exist for testing structures such as container end closures or the like by introducing a gas into a confined area in which the end closure is placed, and recording gas seepage or leakage therethrough. U.S. Pat. No. 3,499,314, issued on Mar. 10, 1970, discloses a testing apparatus wherein an end closure is tested in a cell or chamber formed by a vertically reciprocable upper chambered member and a fixed lower chambered member having seating means therein. The seated end closure is seated in registered fashion with the lower chambered member and sealedly divides the test chamber into two sections. High-pressure gas is supplied into one section while the other is simultaneously purged to the atmosphere to thereby flex the end so that gas leakage can be monitored or sensed in the other section, and leakers can be identified and ejected from the testing system.

U.S. Pats. Nos. 3,875,789 and 3,875,790, each issued on Apr. 8, 1975, disclose similar but improved closure testing apparatus capable of testing an end closure having a displaceable member covering or closing an aperture therein and sealed to the closure body by a distensible sealant material, such as, for example, a metal button down end closure having displaceable opening tabs or buttons sealed thereto by a plastisol, hot melt or other plastic sealant material. The disclosed improved apparatus provide the test chamber with means for effecting a separation between the end closures and their displaceable members or buttons, which include a resisting surface for holding one portion of the end closure in a substantially fixed position while the rest of the end closure is moved away from the buttons. The lower chambered member includes seating means for seating the end closure paratus closes down upon a portion of end closure seated on the seating means, the upper chambered member forces a portion of the end closure downward against spring pressure, and provides a temporary separation between the button and the end closure.

A problem with the prior art apparatus is that loss of registration of the end closure with respect to the lower chambered member seating means sometimes occurs when the upper chambered member is moved vertically upward from the lower chambered member. Although the upper section of the test chamber is purged to the atmosphere during testing, after testing, as the upper chambered member is raised from the end closure and from the lower chambered member, a lifting vacuum is sometimes created in the upper chambered member. This lifting vacuum sometimes moves or lifts the end closure and destroys its registered seated position. This movement is premature and undesirable because it makes it difficult for discharge mechanisms to find, take hold of and move tested end closures to discharge them from the test chamber. It can cause jams and prevents continuous operation of the apparatus. Loss of registration is additionally sometimes created in the improved apparatus of U.S. Pats. Nos. 3,875,789 and 3,875,790, due to sudden upward lurches of the end closure seating means when upward spring force under the end closure suddenly overcomes tackiness between the end closure and occasional accumulated deposits of tacky material such as vaporized plasticisor on the lower chambered member.

BRIEF SUMMARY OF THE INVENTION

This invention overcomes the aforementioned loss of registration and problems associated therewith by providing an improved upper chambered member which includes movement preventing means for preventing premature movement and loss of registration of the end closure from its registered seated position during vertical movement of the upper chambered member. The movement preventing means include a vertically mounted reciprocable elongated member, preferably a contacting-pin, and biasing means, preferably a coil spring, for biasing the elongated member downward toward the lower chambered member such that, after testing, the lower end of the pin remains in contact with the end closure while the upper chambered member is being moved vertically upward from the lower chambered member. Preferably, the upper chambered member has an axial bore therein, and the movement preventing means includes an adaptor connected to the bore, a pinholder connected to the adaptor and having a recess for the coil spring such that the coil spring biases the contacting-pin downward toward the lower chambered member.

It is an object of this invention to provide an apparatus for testing container end closures for leakage by providing an improved upper chambered member which prevents movement and loss of registration of end closures from their registered seated positions on seating means of the fixed lower chambered member, during vertical movement of the upper chambered member.

These and other objects and advantages of this invention will be apparent as it is better understood from the description which follows, which taken in conjunction with the drawings, discloses preferred embodiments thereof.

BRIEF DESCRIPTION OF THE DRAWINGS

FIG. 1 is a top plan view of a button down end closure.

FIG. 2 is a bottom plan view of the end closure of FIG. 1.

FIG. 3 is an enlarged vertical cross section with portions broken away, taken through upper and lower chambered members which form the test chamber of the improved apparatus of this invention.

FIG. 4 is an enlarged vertical cross section with portions broken away showing an end closure in the test chamber of FIG. 3, in a partially closed, unsealed position.

FIG. 5 is an enlarged vertical cross section with portions broken away showing the test chamber of FIG. 4. in a closed, sealed position.

FIG. 6 is an enlarged vertical cross section with portions broken away showing the distended sealant material at the separation effected between the end closure button rim and panel aperture rim.

FIG. 7 is an enlarged vertical cross section with portions broken away showing a pinhole channel in the distended sealant material.

DETAILED DESCRIPTION OF THE INVENTION

Referring to the drawings in detail, FIG. 1 shows the top of a button down end closure generally designated 10 having a central panel 12 which includes raised reinforcing panel portion 14 and displaceable members, here shown as opening tabs or buttons 16, 18. Button 16 is intended as a pour button, and button 18 as a vent button. The buttons close and displacement of the buttons provides pour and vent apertures, respectively defined by central panel aperture rims 20, 22 which can each be formed of raised beads 24, 26. Buttons 16, 18 are connected to the end closure by integral hinges 28, 30 and may have raised central portions and button rims 32, 34 (dashed line) extending under and beyond aperture rims 20, 22 (FIGS. 2 and 3). Central panel 12 also includes peripheral panel portion 36 which merges into a surrounding integral reinforcing groove 38 which in turn merges into peripheral flange 40 for securing the end closure to container bodies as by conventional double seams.

FIG. 2, a bottom view of end closure 10, shows button rims 32, 34 (dashed line) under sealant material 42, 44 shown in the form of rings and which can be any distensible or elastic sealant material used for sealing end closure apertures by sealing portions, preferably the rims, of displaceable members such as buttons 16, 18 to at least the rims of the apertures which they cover or close. The sealant material can be any suitable plastisol, thermoplastic such as hot melt, elastomeric, plastic type tape, or adhesive foil sealant material. An example of a suitable sealant material is a plastisol grade polyvinyl chloride combined with a conventional plasticizer and compounding ingredients. This plastisol is heat curable to form a non-tacky somewhat yieldable material that retains the buttons in place and maintains a suitably hermetic seal under pressure of the magnitude normally found in beer and carbonated beverage containers. Conveniently, the sealant rings fill the area formed by raised beads 24, 26 (FIG. 1) and surround and seal the button rims to the aperture rims. Flange 40 includes a peripheral flange curl 46 which facilitates the seaming of the end closure to a container body. Button down end closure 10 is a pressure-resistant closure which can resist internal container pressures of up to about 90 psi developed at elevated temperatures of up to about 140°F. as often occurs in containers for pressurized products such as beer, carbonated beverages and the like.

FIG. 3 is an enlaraged vertical cross section with portions broken away of a test chamber generally designated 48 which is part of a larger overall apparatus for testing end closures of the aforedescribed type for leakage. Test chamber 48 includes vertically movable or reciprocable upper chambered member 50, fixed lower chambered member 52 affixed to support 54, and means connected to the chambered members for effecting a separation between an end closure and its displaceable member to test the end closure, the sealant material and the seal it provides for lcakage. The separation effecting means can include resisting means, here shown as solid center chuck 56 fixed to the lower chambered member and having an axial gas exit channel 58, connecting gas exit channel 59, and upper resisting surface generally designated 60 which includes concentric steps 61 and 62, 64. Step 61 is for reducing downward flexing of end closure central panel 12, and steps 62, 64 are for resisting downward movement of the buttons or their rims when the rest of the end closure, that is, the non-displaceable portion thereof and its aperture rims, is moved vertically downward. The separation effecting means also includes moving means, here shown as pilot ring 66, peripheral to center chuck 56, and upwardly-biased by and mounted on helical spring 68 in cutout 69, to allow it to move or reciprocate substantially vertically within lower chambered member 52. Pilot ring 66 includes seating means, here shown as a peripheral upstanding flange 70 and a radially inwardly-adjoining circumferential panel seat 72 for seating an end closure in registered position thereon and within lowered chambered member 52. Pilot ring 66 also includes axial gas exit channels 73 (one shown) which can communicate with cavity 75 and cutout 69, and vertical pin channel 74 having pin 76 therein which prevents the pilot ring from rotating yet allows it to reciprocate vertically on the pin fixedly-held as by friction at its base by lower chambered member 52. Gas exit channel 58 communicates, such as through the bore of adaptor 78 screw-fastened within lower chambered member 52, with conventional sensing means (not shown) including means such as a transducer for detecting changes such as pressure increase or build up in lower chamber 80 or the chamber second section as will be explained, due to leakage of the media through horizontally disposed end closure 10 on lower chambered member 52. The sensing means are connected to conventional discharge or sorting means (not shown) including means for rejecting leaker end closures from the test chamber. Lower chamber 80 is formed by cavity 75 and cutout 69.

The improved upper chambered member of this invention here generally designated 50, includes a shaft 82 to which is threadedly connected an air line 84 communicating with a first shaft bore 86, in turn communicating with a second threaded shaft bore 87 and with an upper chamber generally designated 88. Upper chambered member 50 also includes moving means such as engaging means which can be in the form of a circumferential engaging surface 98 for engaging an end closure placed on the pilot ring and for moving the end closure and pilot ring vertically downward. The moving means thereby cooperates with the resisting means to effect a separation my moving the end closure downward relative to and away from the button.

The improved upper chambered member 50 includes movement preventing means, generally designated 100, mounted therein, for contacting end closure 10 and for preventing its premature movement and loss of registration from its registered seated position on the seating means, here, upstanding flange 70 and panel seat 72, while upper chambered member 50 is moved vertically upward after testing the end closure for leakage. Movement preventing means 100 includes a vertically mounted reciprocable member, here, contacting-pin 102 having a head 104 at one end, its top end, and a nose 106 at its lower end, and, biasing means, here, coil spring 108, for biasing contacting-pin 102 downward toward lower chambered member 52. Preferably, the movement preventing means includes and is mounted in the upper chambered member by suitable mounting means, such as an adaptor 108, having a shaft 110 at one end threaded into second threaded bore 87, and threaded member 112 at its other end, a downwardly facing support surface 114, here, at the end of adaptor member 112, and a pinholder 116 threadedly mounted into adaptor member 112 and having a recess 118 of one diameter, a pin-stop surface 120 and, communicating with the recess, a pin-channel 122 of a lesser diameter than the recess, for receiving the shaft of contacting pin 102. Coil spring 108 is positioned in recess 118 such that it is supported at one end by adaptor support surface 114 and its other end abuts contacting-pin head 104 and biases contacting-pin 102 downward toward lower chambered member 52 such that contacting-pin nose 106 projects downwardly past the lower end of pin-holder 116.

When test chamber 48 is in the open position shown in FIG. 3 and pilot ring 66 is upwardly-biased, an end closure, for example, one having a displaceable member, such as button down end closure 10, is placed therein by being seated on pilot ring 66 only by means of its peripheral central panel portion 36 resting on pilot ring seat 72. Pilot ring flange 70 orients and registers the end closure on the pilot ring by fitting into end closure reinforcing groove 38.

As upper chambered member 50 is moved vertically downward, contacting-pin nose 106 contacts a portion of end closure 10, here, its raised reinforcing panel portion 14, and because the force of coil spring 108 (FIG. 3) is less than the strength of the end closure panel and of helical spring 68, coil spring 116 is compressed as contacting pin 102 is forced upward into recess 118 (FIG. 3). Also, circumferential engaging surface 98 engages end closure flange curl 46 and applies a downward force on the end closure, which, through contact between peripheral central panel portion 36 and seat 72, forces pilot ring 66 downward against the bias of spring 68 until pour button 16 is resisted by center chuck upper resisting surface 62, and vent button 18 is resisted by step 64. This resistance prevents further downward movement of the buttons and hold them in a substantially fixed position or plane, relative to further downward movement of the rest of or other portions of the end closure. In FIG. 4, downward movement of engaging surface 98 has brought O-ring 90 into unsealed, non-airtight initial contact with end closure flange 40, and O-ring 92 into unsealed non-airtight initial engagement with lower chambered member 52.

The further downward movement of upper chambered member 50 from the position shown in FIG. 4 to the lower position shown in FIG. 5 further compresses coil spring 108 and further spring-loads contacting-pin 102 into recess 118. The further downward movement also compresses O-rings 90, 92 and provides an airtight seal of upper chamber 88 from the environment. End closure 10 seated on O-ring 90 divides test chamber 48 into two sections. The first section, designated 94, includes the volume between the upper and lower chambered members between O-rings 90 and 92, and that above inverted end closure 10. The portion of the volume of first section 94 above end closure 10 corresponds to a portion of the volume of upper chamber 88. The second section of test chamber 48, generally designated 96, includes all of the volume formed by the seal between end closure flange 40 and compressed O-ring 90, which includes that existing between end closure 10 and pilot ring 66, that of gas exit channels 73, 58 and 59, that between chuck 56 and pilot ring 66, and that of lower chamber 80 as previously defined. This downward movement of upper chambered member 50 from its position in FIG. 4 to that of FIG. 5, also moves or displaces aperture rims 20, 22 away from the buttons or their rims 32, 34 whose downward movement is resisted by chuck resisting surface steps 62 and 64. This downward movement effects a separation between the aperture and button rims and distends or stretches plastisol sealant material 42, 44 a predetermined amount which is less than the elastic limit of the sealant material employed. While the button and panel rims are separated and the sealant material is distended, a testing media preferably a gas pressure, most preferably of high pressure, fed from a supply (not shown) through line 84 and bore 86, is injected into and fills chamber first section 94. This pressure usually flexes end closure central panel 12 slightly downward and causes raised panel portion 14 to contact uppermost chuck surface 61. Spring-loaded contacting-pin nose 106 follows this movement and remains in contact with raised panel portion 14. Conventionally, as first section 94 is gas-pressurized, the second section 96 is simultaneously brought to atmospheric pressure. Taking flexing into account, the slightest increase in gas pressure above atmospheric in the second section due to leakage through any portion of end closure 10 is sensed by conventional sensing means. If there is leakage, a signal is sent by suitable means (not shown) to sorting means which rejects the leaker when upper chambered member 50 is later raised, and removes it from the chamber to allow another end closure to fed thereto.

FIG. 6 is an enlarged view of the distended plastisol sealant material 42 at the separation between panel and button rims 20, 32.

FIG. 7 shows that when a plastisol sealant material 42' is distended by the separation effected between respective aperture and button rims 20', 32', otherwise undetectable pinhole channels 43 are often advantageously exposed to the pressurized gas and thin membrane films supposedly sealing the pinholes are stressed and tested with suitable pressure, here comparable to those of products such as beer and carbonated beverages.

After the testing is completed, the pressurized gas in first section 94 is drained through suitable conventional means such as ports and valves (not shown) to the atmosphere, and, as upper chambered member 50 is raised away from end closure 10 and lower chambered member 52, to the position shown in FIG. 3, the force of compressed coil spring 108 causes contacting-pin nose 106 to remain in contact with end closure 10 until contacting-pin head 104 hits pin stop surface 120 and further upward movement of upper chambered member 50 carries contacting-pin nose 106 up away from end closure 10. Because contacting-pin 102 remains in contact with end closure 10, it prevents the end closure from prematurely moving out of its registered position with respect to the seating means, flange 70 and flange seat 72. Registered position with respect to the apparatus shown, means that end closure peripheral panel 36 is on flange seat 72 and flange 70 is within reinforcing groove 38. The spring force behind contacting-pin 102 is sufficient to overcome upward lifting forces imparted for example by any vacuum in upper chambered member 50 when it is raised, or to overcome sudden upward lurches due to sudden, rather than gradual, releases of spring force under the seating means. Being in the registered position shown on FIG. 3, the tested end closure is in position to be removed and is removed from the test chamber by suitable discharge or sorting means.

The testing media injected into the chamber first section preferably is pressurized gas, which for testing conventional end closure sealant materials, can be from about 5 to 90 psi. For testing end closures for beer and carbonated beverage containers, the higher pressures within this range are preferred. Most preferably, a high-pressure gas of about 80 psi is employed. High gas pressures tend to flex the central panel downwardly but such flexing is prevented by chuck step 61, and what flexing there is does not appear to significantly affect the extent of separation.

The extent of separation between the button and panel aperture rims can be and preferably is controlled by the extend of compression of O-ring 90. Preferably, O-ring 90 is constructed of or treated with a material such as silicone which would tend to prevent any adherence between the closure flange and O-ring which might delay or prevent pilot ring 66 from returning a tested end closure to the end feed-discharge level or position of FIG. 3.

In the embodiment shown in the drawings, the amount of spring pressure exerted by springs 68 is kept low so that the springs have little or no effect on the extent of separation. When the upper chambered member is fully lowered, the spring force is not great enough to move end closure central panel peripheral portion 36 upward and close the gap between the button and aperture rims.

The improved upper chambered member of this invention includes within its scope any suitable movement preventing means for preventing premature movement and loss of registration of an end closure from its registered seated position.

It is thought that the invention and many of its attendant advantages will be understood from the foregoing description and it will be apparent that various changes may be made in the structure of the apparatus without departing from the theory and scope of the invention or sacrificing all of its material advantages, the apparatus disclosed being merely a preferred embodiment thereof.

What is claimed is:

1. An improved apparatus for testing an end closure for leakage, of the type which includes a test chamber formed by a vertically reciprocable upper chambered member and a fixed lower chambered member, and which is sealedly divisible into first and second sections by an end closure placed therein, seating means on the lower chambered member for seating the end closure in registered position thereon and within the lower chambered member, means for injecting high pressure gas into the first section, and sensing means for detecting pressure increase in the second section due to leakage through the end closure, the improvement in the upper chambered member comprising movement preventing means for contacting the end closure to prevent premature movement and loss of registration of the end closure from its registered seated position during vertical movement of the upper chambered member.

2. The improved apparatus of claim 1 wherein the movement preventing means includes a vertically-mounted reciprocable elongated member and biasing means for biasing the elongated member downward toward the lower chambered member such that, after the end closure has been tested, the lower end of the elongated member remains in contact with the end closure while the upper chambered member is moved vertically upward from the lower chambered member.

3. The improved apparatus of claim 2 wherein the movement preventing means includes a downwardly facing support surface, the elongated member is a contacting-pin whose top end is a head, and the biasing means is a coil spring one end of which is supportable by the support surface and the other of which biases the contacting-pin head downward toward the lower chambered member.

4. The improved apparatus of claim 2 wherein the upper chambered member includes an axial threaded bore, the movement preventing means includes an adaptor threaded into the bore, a downwardly facing spring support surface, a pinholder connected to the adaptor and having an axial recess of one diameter, and an axial pin-channel of a lesser diameter communicative with the recess, the elongated member is a contacting-pin having a shaft which passes through the pin-channel, a head positioned in the recess and a nose positioned below the pin-holder, and the biasing means is a coil spring positioned in the recess such that one of its ends is supported by the support surface and the other biases the contacting-pin downward toward the lower chambered member.

* * * * *